(12) United States Patent
Ohara

(10) Patent No.: US 9,535,225 B2
(45) Date of Patent: Jan. 3, 2017

(54) OPTICAL DEVICE

(71) Applicant: OLYMPUS CORPORATION, Tokyo (JP)

(72) Inventor: Satoshi Ohara, Hachioji (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 14/260,343

(22) Filed: Apr. 24, 2014

(65) Prior Publication Data

US 2014/0233904 A1    Aug. 21, 2014

Related U.S. Application Data

(63) Continuation of application No. PCT/JP2012/077765, filed on Oct. 26, 2012.

(30) Foreign Application Priority Data

Oct. 31, 2011    (JP) .................................. 2011-238548

(51) Int. Cl.
   *G02B 6/36*     (2006.01)
   *G02B 6/44*     (2006.01)
   *F21V 8/00*     (2006.01)

(52) U.S. Cl.
   CPC ........... *G02B 6/4439* (2013.01); *G02B 6/0003* (2013.01); *G02B 6/3624* (2013.01)

(58) Field of Classification Search
   None
   See application file for complete search history.

(56) References Cited

U.S. PATENT DOCUMENTS 4,290,667 A    9/1981   Chown
4,725,117 A *  2/1988   Ellis ..................... G02B 6/3846
                                                      156/60

(Continued)

FOREIGN PATENT DOCUMENTS

FR    2 368 727 A1    5/1978
JP    S61-061505 A    3/1986

(Continued)

OTHER PUBLICATIONS

International Preliminary Report on Patentability and Written Opinion dated Nov. 27, 2012 received in related International Application No. PCT/JP2012/077765.

(Continued)

*Primary Examiner* — Hemang Sanghavi
(74) *Attorney, Agent, or Firm* — Scully, Scott, Murphy & Presser, PC

(57) ABSTRACT

An optical device includes a light guiding member that guides light an optical element that functions by being irradiated with the light guided by the light guiding member and a holding member that internally includes a first housing portion housing the light guiding member and a second housing portion housing the optical element and internally holds the light guiding member and the optical element by the first housing portion and the second housing portion so that the light guiding member and the optical element are internally coupled optically. The first housing portion and the second housing portion are communicatively connected inside the holding member and the light guiding member housed in the first housing portion and the optical element housed in the second housing portion are in contact with each other inside the holding member.

9 Claims, 4 Drawing Sheets

(56) References Cited

U.S. PATENT DOCUMENTS

| | | | |
|---|---|---|---|
| 4,919,510 A | | 4/1990 | Hoke et al. |
| 4,924,612 A | * | 5/1990 | Kopelman ................... 40/547 |
| 5,039,193 A | | 8/1991 | Snow et al. |
| 6,550,983 B1 | * | 4/2003 | Gilliland et al. .............. 385/93 |
| 2007/0195538 A1 | * | 8/2007 | Hama ................. G02B 6/0003 362/382 |
| 2008/0075406 A1 | * | 3/2008 | Kadomi et al. .................. 385/79 |
| 2008/0089089 A1 | * | 4/2008 | Hama ................. A61B 1/0653 362/574 |
| 2008/0262316 A1 | * | 10/2008 | Ajima ................. A61B 1/0669 600/178 |
| 2009/0306478 A1 | * | 12/2009 | Mizuyoshi ........... A61B 1/0638 600/178 |
| 2010/0027943 A1 | | 2/2010 | Armani et al. |
| 2010/0172148 A1 | * | 7/2010 | Komazaki et al. ........... 362/551 |
| 2011/0229077 A1 | | 9/2011 | Fortusini et al. |
| 2011/0243510 A1 | | 10/2011 | Ohara |
| 2012/0057325 A1 | * | 3/2012 | Hikmet ............................ 362/19 |
| 2013/0223787 A1 | * | 8/2013 | Bhagavatula et al. .......... 385/12 |

FOREIGN PATENT DOCUMENTS

| | | |
|---|---|---|
| JP | 61-207463 A | 9/1986 |
| JP | S62-023008 A | 1/1987 |
| JP | H02-304509 A | 12/1990 |
| JP | 3-12613 A | 1/1991 |
| JP | 5-71805 U | 9/1993 |
| JP | 2007-188059 A | 7/2007 |
| JP | 2008-224979 A | 9/2008 |
| JP | 2010-160948 A | 7/2010 |

OTHER PUBLICATIONS

Japanese Office Action dated Mar. 1, 2016 from related Japanese Patent Application No. 2011-238548, together with an English language translation.
"200 Practical Tips on Optical Fiber Technology", Japan, The Telecommunications Association, Jul. 10, 1998, revised edition, third printing, p. 253 (2 pages total).
International Search Report dated Nov. 27, 2012 issued in PCT/JP2012/077765.
Extended Supplementary European Search Report dated Jun. 23, 2015 from related European Application No. 12 84 5211.7.
Japanese Office Action dated Sep. 29, 2015 issued in JP 2011-238548.
Japanese Office Action dated Dec. 15, 2015 from related Japanese Patent Application No. 2011-238548, together with an English language translation.
Chinese Office Action dated Jul. 12, 2016 in related Chinese Patent Application No. 201280053962.2.

* cited by examiner

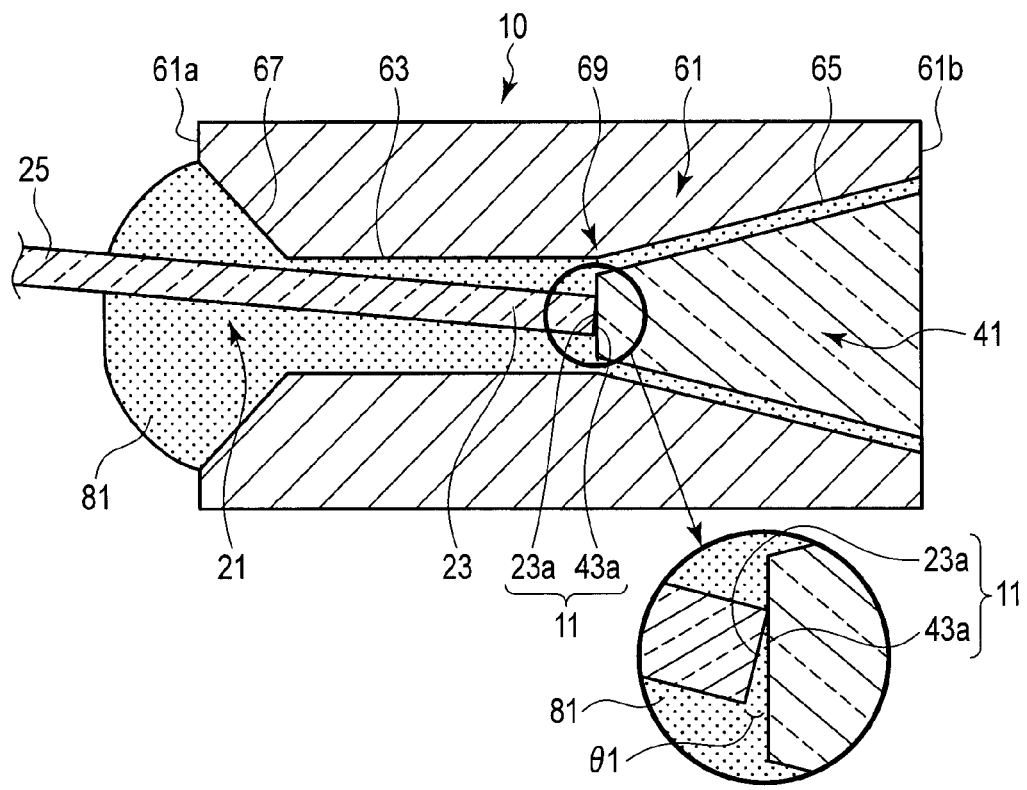
F I G. 2A
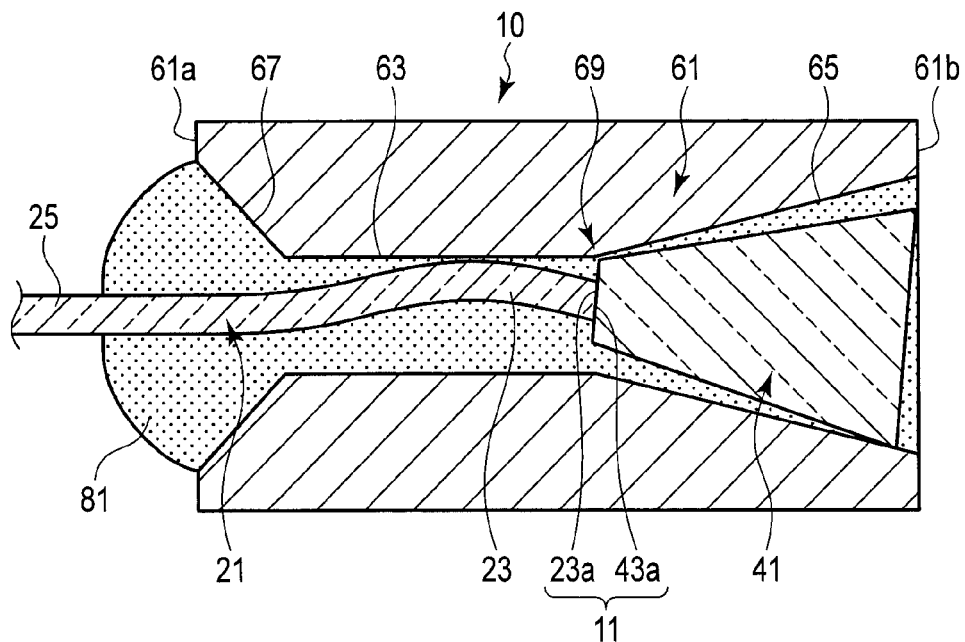
F I G. 2B

OPTICAL DEVICE

CROSS-REFERENCE TO RELATED APPLICATIONS

This application is a Continuation Application of PCT Application No. PCT/JP2012/077765, filed Oct. 26, 2012 and based upon and claiming the benefit of priority from prior Japanese Patent Application No. 2011-238548, filed Oct. 31, 2011, the entire contents of all of which are incorporated herein by reference.

BACKGROUND OF THE INVENTION

1. Field of the Invention

The present invention relates to an optical device including a light guiding member and an optical element.

2. Description of the Related Art

For example, Jpn. Pat. Appln. KOKAI Publication No. 2007-188059 discloses an optical component including a cap and a light-transforming member.

The cap includes a fitting portion having a first hole into which a ferrule is fitted and an arrangement portion having a second hole leading to the first hole. The ferrule holds an optical fiber so that an optical fiber as a light guiding member is inserted through the ferrule.

The light-transforming member is disposed in the second hole. The light-transforming member is fixed by low-melting glass or resin disposed between the light-transforming member and the fitting portion.

The cap is fixed to the ferrule by the ferrule being fitted into the first hole and at least a portion of a side face of the ferrule being YAG-welded to an inner circumferential surface of the first hole. Also, an end portion of the cap can be fixed to the ferrule.

The cap can also be fixed to the ferrule by one of an adhesive, resistance welding, press fitting, and caulking.

BRIEF SUMMARY OF THE INVENTION

An aspect of an optical device of the present invention includes a light guiding member that guides light; an optical element that functions by being irradiated with the light guided by the light guiding member; and a holding member that internally includes a first housing portion housing the light guiding member and a second housing portion housing the optical element and internally holds the light guiding member and the optical element by the first housing portion and the second housing portion so that the light guiding member and the optical element are internally coupled optically, wherein the first housing portion and the second housing portion are communicatively connected inside the holding member and the light guiding member housed in the first housing portion and the optical element housed in the second housing portion are in contact with each other inside the holding member.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2A is a diagram showing the optical device.

FIG. 2B is a diagram showing the optical device.

DETAILED DESCRIPTION OF THE INVENTION

The embodiments of the present invention will be described in detail below with reference to the drawings.

First Embodiment

Configuration

The first embodiment will be described with reference to FIGS. 1, 2A, and 2B.

[Optical Device 10]

Figure 1:
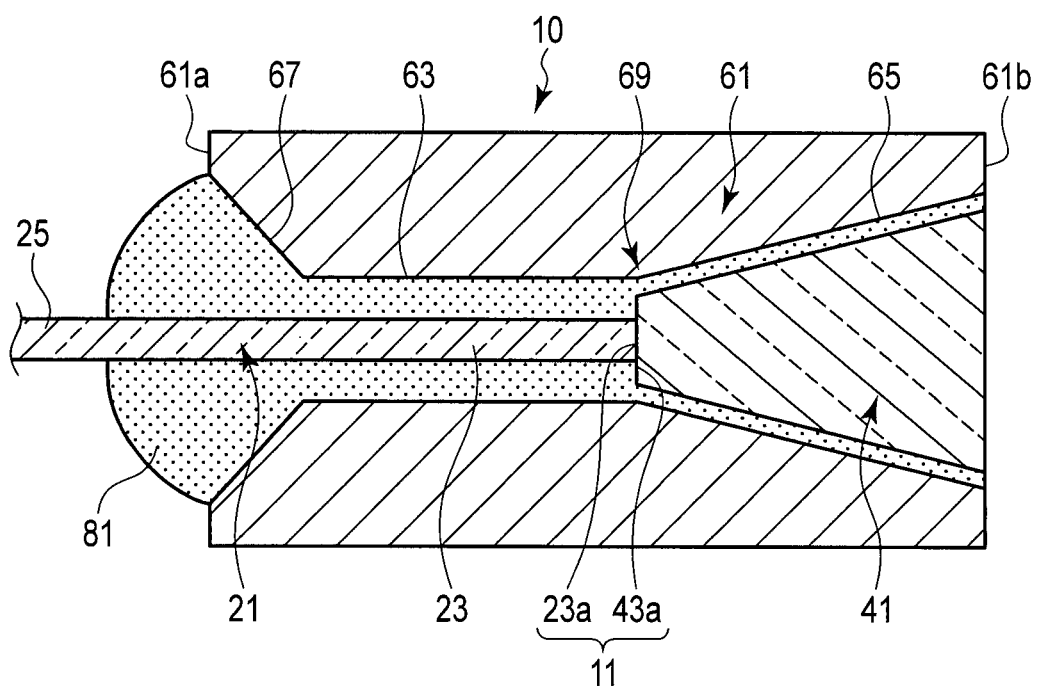
FIG. 1 is a diagram showing an optical device according to a first embodiment of the present invention.

As shown in FIG. 1, an optical device 10 includes a light guiding member that guides light, for example, an optical fiber 21, an optical element 41 that functions by being irradiated with light guided by the optical fiber 21, and a holding member 61 directly holding the optical fiber 21 and the optical element 41.

[Optical Fiber 21]

As shown in FIG. 1, the optical fiber 21 has a flat emission end face 23a disposed at one end 23 of the optical fiber 21 to emit light. The light is, for example, laser beam. The side of another end 25 of the optical fiber 21 is covered with a coating layer (not shown) made of, for example, resin to protect the optical fiber 21. The optical fiber 21 is formed from at least one of glass and plastics. The diameter of the optical fiber 21 is, for example, 0.125 mm.

[Optical Element 41]

The optical element 41 as shown in FIG. 1 has, for example, a phosphor. The optical element 41 emits light, for example, fluorescence to the outside after being irradiated with light guided by the optical fiber 21. The optical element 41 has, for example, a truncated conical shape. However, the optical element 41 is not limited to having a truncated conical shape and may have a cylindrical shape, a hemispherical shape, or a parabolic shape. The rigidity of the optical element 41 is greater than that of the optical fiber 21. The optical element 41 has, for example, one flat end face 43a. The one end face 43a functions as an incident end face through which light emitted from the emission end face 23a enters. The one end face 43a is in contact with the emission end face 23a optically and mechanically to allow the optical fiber 21 and the optical element 41 to optically couple. The one end face 43a is larger than the emission end face 23a.

[Holding Member 61]

The holding member 61 as shown in FIG. 1 has a ferrule formed from at least one of zirconia, glass, and metal. The metal is constituted of at least one of nickel, SUS, and brass. The holding member 61 has, for example, a cylindrical shape. The outside diameter of the holding member 61 is, for example, 1.0 mm.

Also as shown in FIG. 1, the holding member 61 has a first housing portion 63 that houses the one end 23 of the optical fiber 21 and a second housing portion 65 that houses the optical element 41 inside the holding member 61. Then, the holding member 61 directly holds the optical fiber 21 and the optical element 41 inside the holding member 61 by the first housing portion 63 and the second housing portion 65 so that the optical fiber 21 and the optical element 41 are optically coupled inside the holding member 61. Thus, the holding member 61 directly holds the optical fiber 21 in the first housing portion 63 and directly holds the optical element 41 in the second housing portion 65. The optical fiber 21 housed in the first housing portion 63 and the optical element 41 housed in the second housing portion 65 are directly in contact with each other inside the holding member 61. More specifically, only the emission end face 23a of the optical fiber 21 and the one end face 43a of the optical element 41 are in contact with each other optically and mechanically so as to be optically coupled.

As shown in FIG. 1, the first housing portion 63 and the second housing portion 65 are communicatively connected to each other inside the holding member 61 in an axial direction of the holding member 61 so that light emitted from the emission end face 23a of the optical fiber 21 enters the one end face 43a of the optical element 41. More specifically, the first housing portion 63 and the second housing portion 65 are communicatively connected to each other in the axial direction of the holding member 61 at, for example, the center of gravity of the holding member 61. In addition, a center axis of the first housing portion 63 and that of the second housing portion 65 are disposed on the same axis so that light emitted from the emission end face 23a of the optical fiber 21 enters the one end face 43a of the optical element 41. Thus, the first housing portion 63 and the second housing portion 65 are disposed on the center axis of, for example, the holding member 61. The first housing portion 63 is disposed on the side of one end face 61a of the holding member 61 and the second housing portion 65 is disposed on the side of another end face 61b of the holding member 61.

The first housing portion 63 is disposed to allow the holding member 61 to hold the optical fiber 21 and functions as a holding hole to hold the optical fiber 21. The first housing portion 63 also functions as an insertion hole through which the optical fiber 21 is inserted into the holding member 61. As shown in FIGS. 1, 2A, and 2B, the first housing portion 63 is larger than the optical fiber 21 so that the first housing portion 63 has a size allowing deformation and movement of the optical fiber 21. That is, the first housing portion 63 is formed so as to be minutely larger than the optical fiber 21 so that the optical fiber 21 housed in the first housing portion 63 can be bent, deformed, and moved inside the first housing portion 63 and the emission end face 23a follows the one end face 43a to allow the entire surface of the emission end face 23a to come into surface contact with the one end face 43a.

The first housing portion 63 has, for example, a cylindrical shape. The diameter of the first housing portion 63 is, for example, 0.13 mm. Thus, the holding member 61 has a thickness of, for example, 0.87 mm in the radial direction of the first housing portion 63.

As shown in FIG. 1, the holding member 61 has a guide port 67 that guides the one end 23 of the optical fiber 21 into the first housing portion 63 so that the optical fiber 21 is housed in the first housing portion 63. The guide port 67 is disposed on the one end face 61a of the holding member 61. The guide port 67 is communicatively connected to the outside of the optical device 10 and the first housing portion 63. The guide port 67 has a truncated conical shape whose diameter decreases from the one end face 61a of the holding member 61 to the side of the other end face 61b of the holding member 61 and has an inclined tapered shape. The coating layer (not shown) described above is disposed only on the side of the one end face 61a of the holding member 61, more specifically, up to the neighborhood of the guide port 67 and is not inserted into the first housing portion 63. Thus, the one end 23 of the optical fiber 21 is exposed from the coating layer.

The second housing portion 65 is disposed to allow the holding member 61 to hold the optical element 41 and functions as a holding hole. The second housing portion 65 also functions as an insertion hole through which the optical element 41 is inserted into the holding member 61. The second housing portion 65 has the same shape as the optical element 41, for example, a truncated conical shape. Thus, the second housing portion 65 has a decreasing diameter from the other end face 61b to the one end face 61a. The second housing portion 65 has substantially the same size as the optical element 41 and a size that allows the optical element 41 to be glued to the second housing portion 65. Incidentally, the second housing portion 65 may have a size allowing the optical element 41 to be fitted into the second housing portion 65. The second housing portion 65 passes through the other end face 61b of the holding member 61 in the axial direction of the holding member 61.

[Index Matching Material 81]

As shown in FIG. 1, the optical device 10 further includes an index matching material 81 disposed at least in an optical coupling portion 11 formed to allow the optical fiber 21 and the optical element 41 to optically couple. In this case, the optical coupling portion 11 includes, for example, the emission end face 23a, the one end face 43a, and a portion between the emission end face 23a and the one end face 43a in the axial direction of the holding member 61. Then, for example, the emission end face 23a and the one end face 43a are coated with the index matching material 81, the index matching material 81 is interposed between the emission end face 23a and the one end face 43a in the axial direction of the holding member 61. However, the index matching material 81 is not limited to the above case and a communicatively connected portion 69 that communicatively connects the first housing portion 63 and the second housing portion 65 may be filled with the index matching material 81.

The index matching material 81 also functions as an adhesive that glues the optical fiber 21 and the optical element 41 to the holding member 61 by adhering to the optical fiber 21, the optical element 41, and inner circumferential surfaces of the holding member 61. In this case, at least a portion of the first housing portion 63 and at least a portion of the guide port 67 are filled with the index matching material 81 to glue the optical fiber 21 including the coating layer to the holding member 61. Also, at least a portion of the second housing portion 65 is filled with the index matching material 81 to glue the optical element 41 to the holding member 61.

The index matching material 81 is filled in a degassed state.

The index matching material 81 as described above is one of, for example, an optical adhesive, silicone oil, a silicone adhesive, a silicone resin, and an adhesive of epoxy or the like.

The index matching material 81 is an adhesive that is hardened after being heated in, for example, a high-temperature vessel. The index matching material 81 adheres to the optical fiber 21, the optical element 41, and the inner circumferential surfaces of the holding member 61 due to hardening to glue the optical fiber 21 and the optical element 41 to the holding member 61. The hardened index matching material 81 becomes integrated with the optical fiber 21, the optical element 41, and the holding member 61 by adhering to the optical fiber 21, the optical element 41, and the inner circumferential surfaces of the holding member 61. The hardened index matching material 81 is also formed as a rigidity improving member that improves a rigidity of the optical device 10.

The index matching material 81 also adjusts the refractive index in the optical coupling portion 11 to a desired value. Thus, the index matching material 81 has a refractive index higher than that of air. The index matching material 81 further has light resistance. The index matching material 81 as described above is disposed to improve an optical coupling efficiency of the optical fiber 21 and the optical element 41 and to obtain desired optical properties.

[Assembly Method]

Next, the assembly method of the optical device 10 according to the present embodiment is described with reference to FIGS. 1, 2A, and 2B.

For example, the first housing portion 63 and the second housing portion 65 are filled with the index matching material 81 in a degassed state. At this point, the index matching material 81 is injected, for example, into the first housing portion 63, more specifically, to prevent the index matching material 81 from leaking from the one end face 61a of the holding member 61, and into the second housing portion 65 while pressure is being applied by a dispenser, more specifically, to the inside of the holding member 61 from the other end face 61b of the holding member 61.

The optical element 41 is housed in the second housing portion 65 after being inserted into the second housing portion 65 from the side of the other end face 61b of the holding member 61 so as to come into contact with the inner circumferential surface of the holding member 61 in the second housing portion 65. The optical element 41 has substantially the same size as the second housing portion 65 and so is positioned by the second housing portion 65 with high precision.

The optical fiber 21 is guided into the first housing portion 63 by the guide port 67. Then, the optical fiber 21 is inserted into the first housing portion 63 from the guide port 67 so that only the emission end face 23a comes into contact with the one end face 43a before being housed in the first housing portion 63.

The first housing portion 63 and the second housing portion 65 are disposed on, for example, the center axis of the holding member 61. Thus, the optical fiber 21 and the optical element 41 are disposed on the center axis of the holding member 61.

In the present embodiment, even if, as shown in FIG. 2A, the optical fiber 21 is inserted into the first housing portion 63 obliquely with respect to the center axis of the first housing portion 63, the holding member 61 directly holds the optical fiber 21 in the first housing portion 63. Thus, a portion of the emission end face 23a is always in contact with the one end face 43a directly. In this case, an angle of aperture $\theta 1$ is formed between the emission end face 23a and the one end face 43a.

Here, it is assumed that, in contrast to the present embodiment, as described, for example, in Jpn. Pat. Appln. KOKAI Publication No. 2007-188059, a member (not shown) holds the optical fiber 21 so as to cover the optical fiber 21 and the optical fiber 21 is inserted into the first housing portion 63 obliquely with respect to the center axis of the first housing portion 63 together with the member (not shown). That is, the holding member 61 holds the optical fiber 21 indirectly via the member (not shown) in the first housing portion 63. In this case, the first housing portion 63 is assumed to be very slightly larger than the member (not shown). Also in this case, the end face of the member (not shown) comes into contact with the one end face 43a in a state in which the end face is inclined to the one end face 43a. Thus, the emission end face 23a and the one end face 43a are separated and an angle of aperture $\theta 2$ (not shown) is formed between the emission end face 23a and the one end face 43a.

The angle of aperture $\theta 1$ shown in FIG. 1 is smaller than the angle of aperture $\theta 2$ (not shown) by a portion of thickness of the member (not shown). Thus, the distance between the emission end face 23a and the one end face 43a is shorter than when the member (not shown) is disposed. Accordingly, the optical coupling efficiency between the optical fiber 21 and the optical element 41 is improved so that desired optical properties can be obtained.

Adjusting the inclination of the optical fiber 21 including the member (not shown) so that the angle of aperture $\theta 2$ becomes 0 or smaller than the angle of aperture $\theta 1$ is not easy in relation to a very minute gap between the member (not shown) and the first housing portion 63.

In the present embodiment, however, the first housing portion 63 is communicatively connected to the second housing portion 65 inside the holding member 61, is minutely larger than the optical fiber 21, and houses only the optical fiber 21 as a member. Thus, even if, as shown in FIG. 2A, the optical fiber 21 is inserted into the first housing portion 63 obliquely with respect to the center axis of the first housing portion 63, the inclination of the optical fiber 21 can be adjusted so that the entire surface of the emission end face 23a comes into surface contact with the one end face 43a (see FIG. 1). In this manner, the optical fiber 21 is positioned with high precision.

If the above member (not shown) holds the optical fiber 21, bending the member (not shown) including the optical fiber 21 so that the angle of aperture $\theta 2$ becomes 0 or smaller than the angle of aperture $\theta 1$ is not easy in relation to a very minute gap between the member (not shown) and the first housing portion 63.

In the present embodiment, however, the first housing portion 63 is minutely larger than the optical fiber 21 and houses only the optical fiber 21 as a member. In addition, the first housing portion 63 has a size allowing the optical fiber 21 to deform and move. Thus, even if, as shown in FIG. 2A, the optical element 41 is housed by being minutely inclined to the center axis of the holding member 61 and the one end face 43a is inclined to the center axis of the holding member 61, as shown in FIG. 2B, the optical fiber 21 whose rigidity is lower than that of the optical element 41 is bent by only the emission end face 23a being brought into contact with the one end face 43a when the optical fiber 21 is inserted into the first housing portion 63. At this point, the optical fiber 21 is bent so that the emission end face 23a follows the one end face 43a. Accordingly, as shown in FIG. 2B, the entire surface of the emission end face 23a comes into surface contact with the one end face 43a. As a result, the optical fiber 21 is positioned with high precision, and the optical coupling efficiency between the optical fiber 21 and the optical element 41 is improved so that desired optical properties are obtained.

In such a state, the holding member 61 is inserted into a high-temperature vessel and heated. Accordingly, the index matching material 81 is hardened. Thus, the optical fiber 21 and the optical element 41 adhere to the inner circumferential surface of the holding member 61 while the emission end face 23a is in contact with the one end face 43a, thereby being held by the holding member 61.

In this manner, the optical device 10 is assembled.

[Effect]

In the present embodiment, as described above, the first housing portion 63 and the second housing portion 65 are communicatively connected inside the holding member 61 and only the optical fiber 21 housed in the first housing portion 63 and the optical element 41 housed in the second housing portion 65 are directly in contact with each other inside the holding member 61. Accordingly, in the present embodiment, the distance between the optical fiber 21 and the optical element 41 can be reduced, the optical fiber 21 and the optical element 41 can be positioned with high precision, and the optical coupling efficiency between the optical fiber 21 and the optical element 41 can be improved so that desired optical properties can be obtained.

In the present embodiment, the holding member 61 directly holds the optical fiber 21 in the first housing portion 63. Thus, according to the first embodiment, even if, as shown in FIG. 2A, the optical fiber 21 is inserted into the first housing portion 63 obliquely with respect to the center axis of the first housing portion 63, the emission end face 23a and the one end face 43a can be brought into contact with each other. In this case, the distance between the emission end face 23a and the one end face 43a can be made shorter than the distance when the member (not shown) is disposed. Therefore, according to the present embodiment, the optical coupling efficiency between the optical fiber 21 and the optical element 41 can be improved so that desired optical properties can be obtained.

Also in the present embodiment, the first housing portion 63 is communicatively connected to the second housing portion 65 inside the holding member 61, is minutely larger than the optical fiber 21, and houses only the optical fiber 21 as a member.

Thus, in the present embodiment, even if, as shown in FIG. 2A, the optical fiber 21 is inserted into the first housing portion 63 obliquely with respect to the center axis of the first housing portion 63, the inclination of the optical fiber 21 can be adjusted so that the entire surface of the emission end face 23a is in surface contact with the one end face 43a (see FIG. 1). Therefore, according to the present embodiment, the optical fiber 21 can be positioned with high precision.

Also in the present embodiment, the first housing portion 63 is minutely larger than the optical fiber 21 and houses only the optical fiber 21 as a member. In addition, the first housing portion 63 has a size allowing the optical fiber 21 to deform and move.

Thus, in the present embodiment, even if, as shown in FIG. 2B, the optical element 41 is housed by minutely being inclined to the center axis of the holding member 61 and the one end face 43a is inclined to the center axis of the holding member 61, the optical fiber 21 whose rigidity is lower than that of the optical element 41 is bent by the emission end face 23a being brought into contact with the one end face 43a when the optical fiber 21 is inserted into the first housing portion 63. At this point, the optical fiber 21 is bent so that the emission end face 23a follows the one end face 43a. Accordingly, in the present embodiment, the entire surface of the emission end face 23a can be brought into surface contact with the one end face 43a. Therefore, according to the present embodiment, the optical fiber 21 and the optical element 41 can be positioned with high precision and the optical coupling efficiency between the optical fiber 21 and the optical element 41 can be improved so that desired optical properties can be obtained.

If, for example, the holding member 61 indirectly holds the optical fiber 21 via a member (not shown), the optical fiber 21 and the member (not shown) are housed in the first housing portion 63, and the member (not shown) can be inclined, thus the first housing portion 63 needs to increase in volume. Accordingly, the thickness of the holding member 61 around the first housing portion 63 becomes thinner than that in the present embodiment. In the present embodiment, however, the holding member 61 directly holds the optical fiber 21 and only the optical fiber 21 is housed in the first housing portion 63. Thus, according to the present embodiment, when compared with a case in which the member (not shown) is disposed, the thickness of the holding member 61 around the first housing portion 63 can be made thicker, preventing the holding member 61 from being chipped or breaking. Therefore, in the present embodiment, the strength of the optical device 10 can be improved and yields of parts machining can be improved.

Also in the present embodiment, the holding member 61 directly holds the optical fiber 21 and thus, heat from the optical fiber 21 can directly be conducted to the holding member 61 so that heat dissipation properties can be improved.

Also in the present embodiment, by disposing the center axis of the first housing portion 63 and the center axis of the second housing portion 65 on the same axis, the optical fiber 21 and the optical element 41 can easily be positioned with high precision and the optical fiber 21 and the optical element 41 can reliably be optically coupled.

Also in the present embodiment, the optical coupling efficiency between the optical fiber 21 and the optical element 41 can be improved by the index matching material 81 so that desired optical properties can be obtained. Also in the present embodiment, the optical fiber 21 and the optical element 41 can be glued to the holding member 61 by the index matching material 81 so that the optical fiber 21 and the optical element 41 can be easily positioned.

Also in the present embodiment, the inclination of only the optical fiber 21 is adjusted and only the optical fiber 21 is bent. Accordingly, in the present embodiment, positional shifts and optical losses during optical coupling can be suppressed when compared with a case in which the inclination of the optical element 41 is made to be adjusted.

[First Modification and Second Modification]

Next, a first modification and a second modification of the present embodiment will be described with reference to FIGS. 3A and 3B.

The optical device 10 further includes a communicative connection portion 71 disposed inside the holding member 61 to communicatively connect the optical coupling portion 11 formed to optically couple the optical fiber 21 and the optical element 41 and the outside of the holding member 61. The communicative connection portion 71 functions as a discharge portion that discharges bubbles released from the index matching material 81 in the optical coupling portion 11 to the outside of the holding member 61.

Figure 3A:
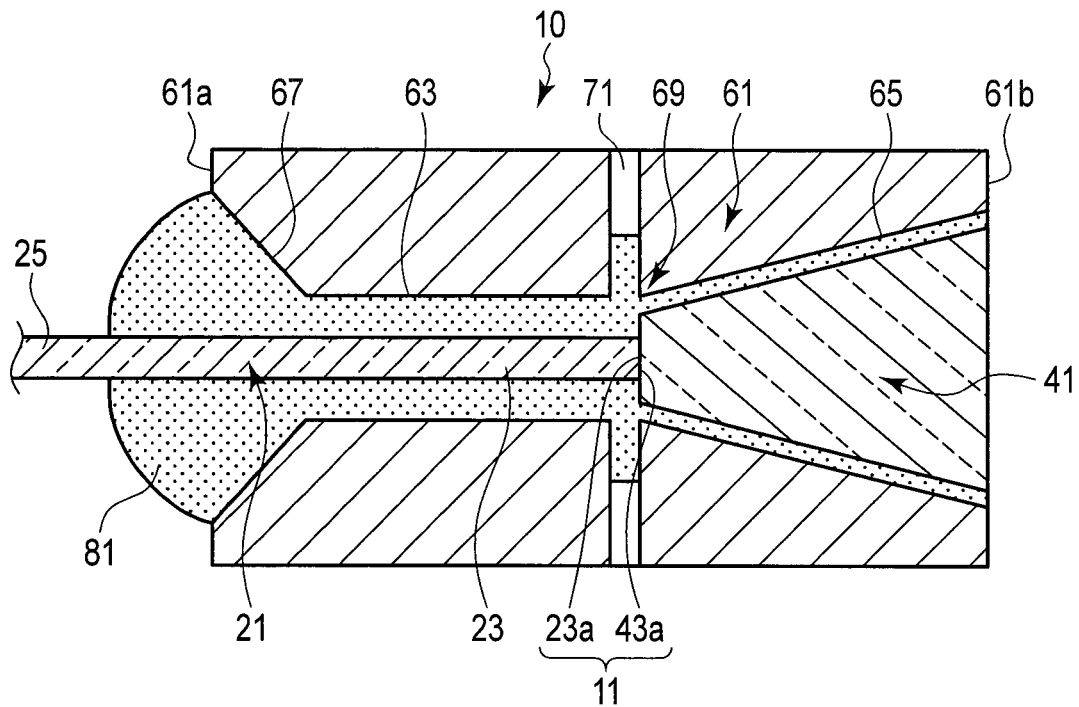
FIG. 3A is a diagram showing an optical device according to a first modification of the first embodiment of the present invention.

In the first modification shown in FIG. 3A, the communicative connection portion 71 is disposed along the radial direction of the holding member 61. As shown in FIG. 3A, for example, the two communicative connection portions 71 are disposed and the one communicative connection portion 71 and the other communicative connection portion 71 are disposed in a circumference direction of the holding member 61 by being separated by 180°.

Figure 3B:
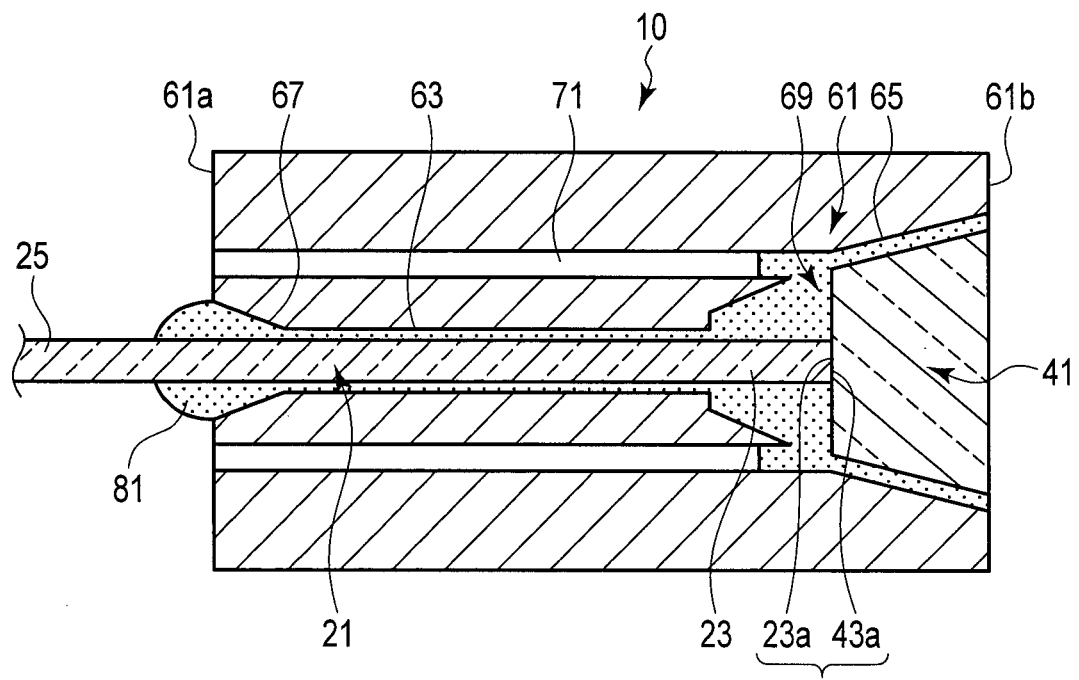
FIG. 3B is a diagram showing an optical device according to a second modification of the first embodiment of the present invention.

In the second modification shown in FIG. 3B, the communicative connection portion 71 is disposed along the axial direction of the holding member 61 up to the side of the one end face 43a and is disposed by being shifted in the radial direction of the holding member 61 with respect to the first housing portion 63. In this case, the first housing portion 63 increases in diameter toward, for example, the one end face 43a so as to communicatively connect to the communicative connection portion 71 in the optical coupling portion 11.

Thus, in these modifications, bubbles released from the index matching material 81 can reliably be discharged to the outside of the holding member 61 by the communicative connection portion 71. Therefore, according to the present embodiment, bubbles can reliably be prevented from entering the optical coupling portion 11 and the optical coupling efficiency can be prevented from deteriorating due to bubbles so that desired optical properties cab reliably be obtained.

Incidentally, the number, shape, and the size of the communicative connection portion 71 are not particularly limited.

Second Embodiment

Figure 4:
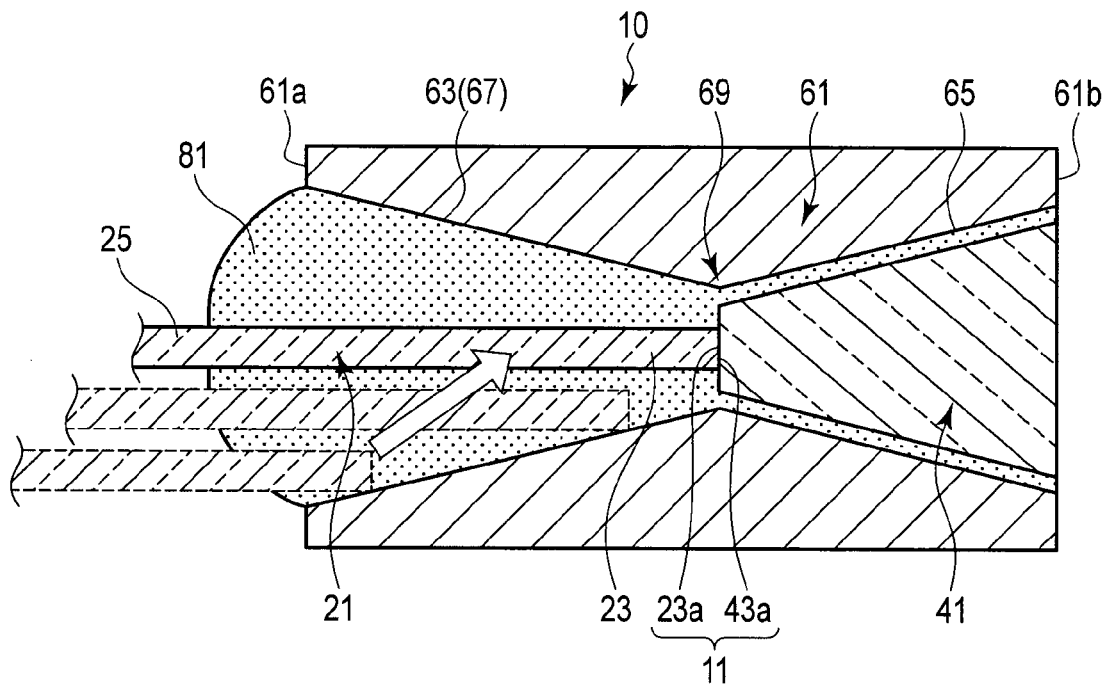
FIG. 4 is a diagram showing an optical device according to a second embodiment of the present invention.

Next, the second embodiment will be described with reference to FIG. 4.

The first housing portion 63 is formed so as to taper toward the second housing portion 65 in the axial direction of the holding member 61. The first housing portion 63 has, for example, a truncated conical shape whose diameter decrease toward the second housing portion 65. Thus, the first housing portion 63 has a tapered shape. In the first housing portion 63, the size of the diameter on the side of the one end face 61a is larger than the diameter of the optical fiber 21. The first housing portion 63 functions also as the guide port 67.

Accordingly, in the present embodiment, the optical fiber 21 can easily be inserted into the first housing portion 63 due to the first housing portion 63 formed so as to be tapered and the optical fiber 21 can be positioned with higher precision.

Also according to the present embodiment, when compared with the first embodiment, the gap between the optical fiber 21 and the inner circumferential surface of the holding member 61 in the first housing portion 63 is formed large on the side of the one end face 61a. Thus, if the optical fiber 21 is housed in the first housing portion 63 after the first housing portion 63 is filled with the index matching material 81, according to the present embodiment, the optical fiber 21 can easily be housed in the first housing portion 63 and the optical fiber 21 can freely be positioned.

Third Embodiment

Figure 5:
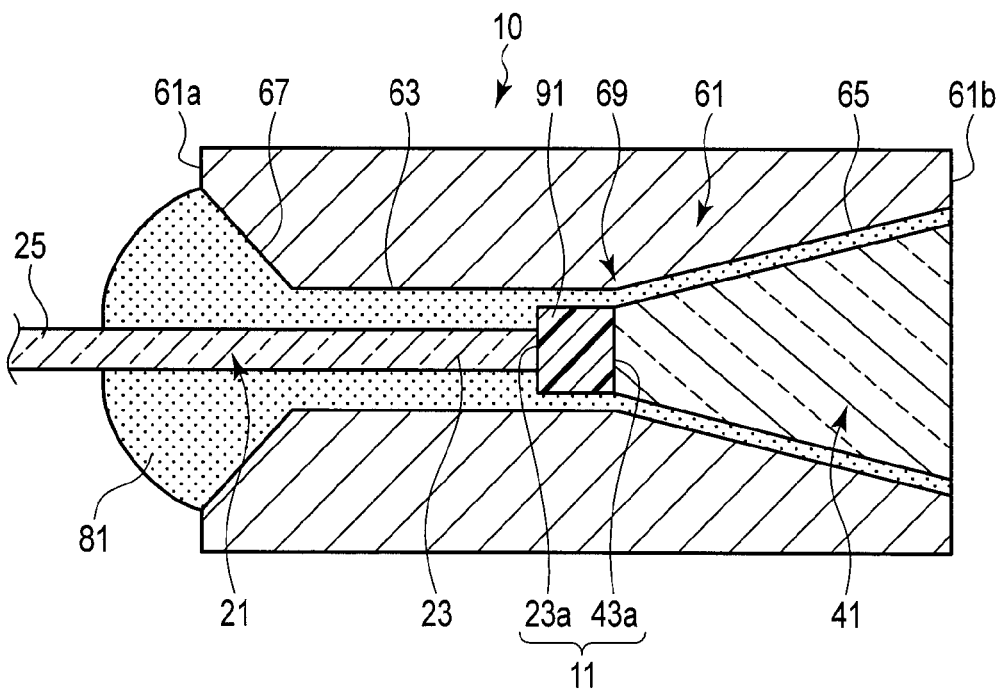
FIG. 5 is a diagram showing an optical device according to a third embodiment of the present invention.

Next, the third embodiment will be described with reference to FIG. 5.

The optical device 10 further includes an elastic member 91 disposed in the optical coupling portion 11 formed to optically couple the optical fiber 21 and the optical element 41 and having a rigidity lower than that of the optical fiber 21. The elastic member 91 is interposed between the emission end face 23a of the optical fiber 21 and the one end face 43a of the optical element 41 in the axial direction of the holding member 61. When the emission end face 23a of the optical fiber 21 and the one end face 43a of the optical element 41 come into contact, the elastic member 91 prevents the emission end face 23a and the one end face 43a from being damaged and functions as a cushioning material to cushion an impact during contact. The elastic member 91 is, for example, rubber formed from silicon resin.

For example, the elastic member 91 is disposed on one of the emission end face 23a and the one end face 43a in advance. If the elastic member 91 is disposed on the emission end face 23a, as shown in FIG. 5, the elastic member 91 is housed in the first housing portion 63 together with the optical fiber 21. If the elastic member 91 is disposed on the one end face 43a, the elastic member 91 is housed in the second housing portion 65 together with the optical element 41. The elastic member 91 only needs to be disposed in at least one of the first housing portion 63 and the second housing portion 65.

Accordingly, in the present embodiment, when the emission end face 23a of the optical fiber 21 and the one end face 43a of the optical element 41 come into contact by the elastic member 91, the emission end face 23a and the one end face 43a can be prevented from being damaged and an impact during contact can be cushioned.

Also in the present embodiment, the elastic member 91 has a higher transmittance than that of air. Therefore, in the present embodiment, even if the elastic member 91 is interposed between the emission end face 23a and the one end face 43a, the optical coupling efficiency can be prevented from deteriorating due to the elastic member 91 so that desired optical properties can be obtained.

The present invention is not limited to the above embodiments themselves and can be embodied by modifying elements without deviating from the spirit thereof in the stage of working. In addition, various inventions can be formed by appropriately combining a plurality of elements disclosed in the above embodiments.

What is claimed is:
1. An optical device comprising:
a light guide configured to guide light;
an optical element comprising an end face, the end face of the optical element facing an end face of the light guide, the optical element being configured to function by being irradiated with the light guided by the light guide through the end face of the optical element; and
a holder including an internal cavity, the internal cavity comprising:
a first portion configured to hold the light guide; and
a second portion configured to hold the optical element;
wherein a surface defining the first portion at a junction connecting the first portion and the second portion is not parallel to a surface defining the second portion at the junction in a cross-section of the holder;
the holder is configured to hold the light guide and the optical element in the first portion and the second portion, respectively, of the internal cavity, so that the light guide and the optical element are coupled optically in the internal cavity; and
the first portion and the second portion are communicatively connected inside the internal cavity.
2. The optical device according to claim 1 further comprising an adhesive configured to adhere the light guide to at least an internal surface of the first portion.

3. The optical device according to claim 1, further comprising an adhesive configured to adhere the light guide to the optical element.

4. The optical device according to claim 1, further comprising an adhesive configured to adhere the optical element to the second portion of the internal cavity.

5. The optical device according to claim 1, wherein the first portion includes at least a portion tapering toward the second portion in an axial direction of the holder.

6. The optical device according to claim 1, wherein the second portion includes at least a portion tapering toward the junction in an axial direction of the holder.

7. The optical device according to claim 1, wherein the optical element comprises phosphor.

8. The optical device according to claim 1, wherein the optical element is configured to have a truncated conical shape.

9. The optical device according to claim 1, wherein the light guide comprises an optical fiber.

* * * * *